(12) United States Patent
Su et al.

(10) Patent No.: US 10,380,134 B2
(45) Date of Patent: Aug. 13, 2019

(54) INTEGRATED PREDICTIVE ANALYSIS

(71) Applicant: SAP SE, Walldorf (DE)

(72) Inventors: Teresa Su, Vancouver (CA); Jan Rittinger, Wiesloch (DE); Amir Hajizadeh, Vancouver (CA)

(73) Assignee: SAP SE, Walldorf (DE)

( * ) Notice: Subject to any disclaimer, the term of this patent is extended or adjusted under 35 U.S.C. 154(b) by 253 days.

(21) Appl. No.: 15/382,920

(22) Filed: Dec. 19, 2016

(65) Prior Publication Data

US 2018/0173707 A1    Jun. 21, 2018

(51) Int. Cl.
*G06F 17/30* (2006.01)
*G06F 16/25* (2019.01)
*G06F 16/242* (2019.01)
*G06F 16/248* (2019.01)
*G06F 16/2455* (2019.01)

(52) U.S. Cl.
CPC .......... *G06F 16/252* (2019.01); *G06F 16/242* (2019.01); *G06F 16/248* (2019.01); *G06F 16/2455* (2019.01)

(58) Field of Classification Search
None
See application file for complete search history.

(56) References Cited

U.S. PATENT DOCUMENTS

| | | | | |
|---|---|---|---|---|
| 6,282,544 | B1 * | 8/2001 | Tse .................. | G06Q 10/06 707/600 |
| 2009/0248726 | A1 * | 10/2009 | Barber .............. | G06F 17/30592 |
| 2011/0295870 | A1 * | 12/2011 | Bolsius ............. | G06F 16/243 707/765 |
| 2014/0258209 | A1 * | 9/2014 | Eshleman .......... | G06F 16/283 707/602 |
| 2015/0081618 | A1 * | 3/2015 | Schuster ........... | G06F 17/30563 707/602 |
| 2016/0103903 | A1 * | 4/2016 | Vivalda ............. | G06F 17/30592 709/204 |
| 2016/0217401 | A1 * | 7/2016 | Leung .............. | G06Q 10/06311 |
| 2016/0299944 | A1 * | 10/2016 | Isaacson ............ | G06F 16/283 |

\* cited by examiner

*Primary Examiner* — Hung D Le
(74) *Attorney, Agent, or Firm* — Buckley, Maschoff & Talwalkar LLC

(57) ABSTRACT

A system includes determination of a query context comprising a measure and one or more dimension values of a data source, generation of a query of the data source for the measure over time and aggregated over the one or more dimension values, reception of a result set of the query, providing of the result set to a predictive analysis engine, and reception of forecast data based on the result set, the forecast data comprising forecast values of the measure over time, aggregated over the one or more dimension values.

17 Claims, 11 Drawing Sheets

ProfitAndLoss
In Million USD

| ACCOUNT | PRODUCT | VERSION REGION | VERSION Actuals Actual | Forecast Forecast |
|---|---|---|---|---|
| ▼ Income Statement | | | | |
| ▲ Taxes | ▲ All Products | ▲ All Companies | 36.61 | 64.94 |
| ▲ General and Administrative Expenses | ▲ All Products | ▲ All Companies | -8.97 | -16.68 |
| ▲ Cost of Goods Sold | ▲ All Products | ▲ All Companies | -193.62 | -389.03 |
| ▼ Net Revenue | ▲ All Products | ▲ All Companies | -219.54 | -417.91 |
| | ▲ All Products | ▲ All Companies | 458.73 | 888.53 |
| | ▲ Apparel | ▲ All Companies | 5.25 | 15.23 |
| | | ▼ North America | 3.05 | 8.80 |
| | | United States | 2.01 | 5.39 |
| | | Canada | 1.04 | 3.41 |
| | | ▲ EMEA | 2.19 | 6.43 |
| | ▲ Footwear | ▲ All Companies | 189.50 | 369.82 |
| | ▲ Accessories | ▲ All Companies | 263.98 | 503.48 |
| ▼ Key Performance Indicators | ▲ All Products | ▲ All Companies | — | — |
| Gross Margin | ▲ All Products | ▲ All Companies | 239.19 | 470.62 |
| Gross Margin % | ▲ All Products | ▲ All Companies | 52.1% | 53.0% |
| Operating Profit | ▲ All Products | ▲ All Companies | 45.57 | 81.59 |
| Operating Profit % | ▲ All Products | ▲ All Companies | 9.9% | 9.2% |

— 300
— 405
— 410
— 415
— 420
— 400

Data Source
ProfitAndLoss ▽

▽ Table Structure

ROWS
Account — All Members ✕
Product ✕
Region ✕
+ Add Measures/Dimensions

COLUMNS
Version ✕
+ Add Measures/Dimensions

FILTERS
+ Add Filters

| NET REVENUE | North America ||||||||||
| | U.S.A. ||||| Canada |||||
| | Apparel || Footwear ||| Apparel || Footwear |||
| | Shirts | Shorts | FW1 | FW2 | FW3 | Shirts | Shorts | FW1 | FW2 | FW3 |
|---|---|---|---|---|---|---|---|---|---|---|
| Jan 2013 | ~~~~ | ~~~~ | ~~~ | ~~~ | ~~~ | ~~~~ | ~~~~ | ~~~ | ~~~ | ~~~ |
| Feb 2013 | ~~~~ | ~~~~ | ~~~ | ~~~ | ~~~ | ~~~~ | ~~~~ | ~~~ | ~~~ | ~~~ |
| Mar 2013 | ~~~~ | ~~~~ | ~~~ | ~~~ | ~~~ | ~~~~ | ~~~~ | ~~~ | ~~~ | ~~~ |
| Apr 2013 | ~~~~ | ~~~~ | ~~~ | ~~~ | ~~~ | ~~~~ | ~~~~ | ~~~ | ~~~ | ~~~ |
| May 2013 | ~~~~ | ~~~~ | ~~~ | ~~~ | ~~~ | ~~~~ | ~~~~ | ~~~ | ~~~ | ~~~ |
| Jun 2013 | ~~~~ | ~~~~ | ~~~ | ~~~ | ~~~ | ~~~~ | ~~~~ | ~~~ | ~~~ | ~~~ |
| Jul 2013 | ~~~~ | ~~~~ | ~~~ | ~~~ | ~~~ | ~~~~ | ~~~~ | ~~~ | ~~~ | ~~~ |
| Aug 2013 | ~~~~ | ~~~~ | ~~~ | ~~~ | ~~~ | ~~~~ | ~~~~ | ~~~ | ~~~ | ~~~ |
| Sep 2013 | ~~~~ | ~~~~ | ~~~ | ~~~ | ~~~ | ~~~~ | ~~~~ | ~~~ | ~~~ | ~~~ |
| Oct 2013 | ~~~~ | ~~~~ | ~~~ | ~~~ | ~~~ | ~~~~ | ~~~~ | ~~~ | ~~~ | ~~~ |
| Nov 2013 | ~~~~ | ~~~~ | ~~~ | ~~~ | ~~~ | ~~~~ | ~~~~ | ~~~ | ~~~ | ~~~ |
| Dec 2013 | ~~~~ | ~~~~ | ~~~ | ~~~ | ~~~ | ~~~~ | ~~~~ | ~~~ | ~~~ | ~~~ |
| Jan 2014 | ~~~~ | ~~~~ | ~~~ | ~~~ | ~~~ | ~~~~ | ~~~~ | ~~~ | ~~~ | ~~~ |
| Feb 2014 | ~~~~ | ~~~~ | ~~~ | ~~~ | ~~~ | ~~~~ | ~~~~ | ~~~ | ~~~ | ~~~ |
| Mar 2014 | ~~~~ | ~~~~ | ~~~ | ~~~ | ~~~ | ~~~~ | ~~~~ | ~~~ | ~~~ | ~~~ |
| Apr 2014 | ~~~~ | ~~~~ | ~~~ | ~~~ | ~~~ | ~~~~ | ~~~~ | ~~~ | ~~~ | ~~~ |
| May 2014 | ~~~~ | ~~~~ | ~~~ | ~~~ | ~~~ | ~~~~ | ~~~~ | ~~~ | ~~~ | ~~~ |
| Jun 2014 | ~~~~ | ~~~~ | ~~~ | ~~~ | ~~~ | ~~~~ | ~~~~ | ~~~ | ~~~ | ~~~ |
| Jul 2014 | ~~~~ | ~~~~ | ~~~ | ~~~ | ~~~ | ~~~~ | ~~~~ | ~~~ | ~~~ | ~~~ |
| Aug 2014 | ~~~~ | ~~~~ | ~~~ | ~~~ | ~~~ | ~~~~ | ~~~~ | ~~~ | ~~~ | ~~~ |
| Sep 2014 | ~~~~ | ~~~~ | ~~~ | ~~~ | ~~~ | ~~~~ | ~~~~ | ~~~ | ~~~ | ~~~ |
| Oct 2014 | | | | | | | | | | |
| Nov 2014 | | | | | | | | | | |
| Dec 2014 | | | | | | | | | | |
| Jan 2015 | | | | | | | | | | |

*FIG. 5*

ProfitAndLoss
In Million USD

| ACCOUNT | PRODUCT | REGION | VERSION Actuals Actual | VERSION Forecast Forecast |
|---|---|---|---|---|
| ▼ Income Statement | ▲ All Products | ▲ All Companies | 36.61 | 64.94 |
| ▲ Taxes | ▲ All Products | ▲ All Companies | -8.97 | -16.68 |
| ▲ General and Administrative Expenses | ▲ All Products | ▲ All Companies | -193.62 | -389.03 |
| ▲ Cost of Goods Sold | ▲ All Products | ▲ All Companies | -219.54 | -417.91 |
| ▼ Net Revenue | ▲ All Products | ▲ All Companies | 458.73 | 888.53 |
|  | ▼ Apparel | ▲ All Companies | 5.25 | 15.23 |
|  |  | ▼ North America | 3.05 | 8.80 |
|  |  | United States | 2.01 | 5.39 |
|  |  | Canada | 1.04 | 3.41 |
|  |  | ▲ EMEA | 2.19 | 6.43 |
|  | ▲ Footwear | ▲ All Companies | 189.50 | 369.82 |
|  | ▲ Accessories | ▲ All Companies | 263.98 | 503.48 |
| ▼ Key Performance Indicators | ▲ All Products | ▲ All Companies | — | — |
| Gross Margin | ▲ All Products | ▲ All Companies | 239.19 | 470.62 |
| Gross Margin % | ▲ All Products | ▲ All Companies | 52.1% | 53.0% |
| Operating Profit | ▲ All Products | ▲ All Companies | 45.57 | 81.59 |
| Operating Profit % | ▲ All Products | ▲ All Companies | 9.9% | 9.2% |

Data Source
ProfitAndLoss
▽ Table Structure
ROWS
Account / All Members
Product
Region
+ Add Measures/Dimensions
COLUMNS
Version
+ Add Measures/Dimensions
FILTERS
+ Add Filters

FIG. 6

| Time | Net Revenue |
|---|---|
| Jan 2013 | ~~~~~ |
| Feb 2013 | ~~~~~ |
| Mar 2013 | ~~~~~ |
| Apr 2013 | ~~~~~ |
| May 2013 | ~~~~~ |
| Jun 2013 | ~~~~~ |
| Jul 2013 | ~~~~~ |
| Aug 2013 | ~~~~~ |
| Sep 2013 | ~~~~~ |
| Oct 2013 | ~~~~~ |
| Nov 2013 | ~~~~~ |
| Dec 2013 | ~~~~~ |
| Jan 2014 | ~~~~~ |
| Feb 2014 | ~~~~~ |
| Mar 2014 | ~~~~~ |
| Apr 2014 | ~~~~~ |
| May 2014 | ~~~~~ |
| Jun 2014 | ~~~~~ |
| Jul 2014 | ~~~~~ |
| Aug 2014 | ~~~~~ |
| Sep 2014 | ~~~~~ |

FIG. 8

| Time | Net Revenue |
|---|---|
| Oct 2014 | ~~~~~ |
| Nov 2014 | ~~~~~ |
| Dec 2014 | ~~~~~ |
| Jan 2015 | ~~~~~ |

FIG. 9

| NET REVENUE | North America | | | | | | | | | |
|---|---|---|---|---|---|---|---|---|---|---|
| | U.S.A. | | | | | Canada | | | | |
| | Apparel | | Footwear | | | Apparel | | Footwear | | |
| | Shirts | Shorts | FW1 | FW2 | FW3 | Shirts | Shorts | FW1 | FW2 | FW3 |
| Jan 2013 | ~~~~ | ~~~~ | ~~~ | ~~~ | ~~~ | ~~~~ | ~~~~ | ~~~ | ~~~ | ~~~ |
| Feb 2013 | ~~~~ | ~~~~ | ~~~ | ~~~ | ~~~ | ~~~~ | ~~~~ | ~~~ | ~~~ | ~~~ |
| Mar 2013 | ~~~~ | ~~~~ | ~~~ | ~~~ | ~~~ | ~~~~ | ~~~~ | ~~~ | ~~~ | ~~~ |
| Apr 2013 | ~~~~ | ~~~~ | ~~~ | ~~~ | ~~~ | ~~~~ | ~~~~ | ~~~ | ~~~ | ~~~ |
| May 2013 | ~~~~ | ~~~~ | ~~~ | ~~~ | ~~~ | ~~~~ | ~~~~ | ~~~ | ~~~ | ~~~ |
| Jun 2013 | ~~~~ | ~~~~ | ~~~ | ~~~ | ~~~ | ~~~~ | ~~~~ | ~~~ | ~~~ | ~~~ |
| Jul 2013 | ~~~~ | ~~~~ | ~~~ | ~~~ | ~~~ | ~~~~ | ~~~~ | ~~~ | ~~~ | ~~~ |
| Aug 2013 | ~~~~ | ~~~~ | ~~~ | ~~~ | ~~~ | ~~~~ | ~~~~ | ~~~ | ~~~ | ~~~ |
| Sep 2013 | ~~~~ | ~~~~ | ~~~ | ~~~ | ~~~ | ~~~~ | ~~~~ | ~~~ | ~~~ | ~~~ |
| Oct 2013 | ~~~~ | ~~~~ | ~~~ | ~~~ | ~~~ | ~~~~ | ~~~~ | ~~~ | ~~~ | ~~~ |
| Nov 2013 | ~~~~ | ~~~~ | ~~~ | ~~~ | ~~~ | ~~~~ | ~~~~ | ~~~ | ~~~ | ~~~ |
| Dec 2013 | ~~~~ | ~~~~ | ~~~ | ~~~ | ~~~ | ~~~~ | ~~~~ | ~~~ | ~~~ | ~~~ |
| Jan 2014 | ~~~~ | ~~~~ | ~~~ | ~~~ | ~~~ | ~~~~ | ~~~~ | ~~~ | ~~~ | ~~~ |
| Feb 2014 | ~~~~ | ~~~~ | ~~~ | ~~~ | ~~~ | ~~~~ | ~~~~ | ~~~ | ~~~ | ~~~ |
| Mar 2014 | ~~~~ | ~~~~ | ~~~ | ~~~ | ~~~ | ~~~~ | ~~~~ | ~~~ | ~~~ | ~~~ |
| Apr 2014 | ~~~~ | ~~~~ | ~~~ | ~~~ | ~~~ | ~~~~ | ~~~~ | ~~~ | ~~~ | ~~~ |
| May 2014 | ~~~~ | ~~~~ | ~~~ | ~~~ | ~~~ | ~~~~ | ~~~~ | ~~~ | ~~~ | ~~~ |
| Jun 2014 | ~~~~ | ~~~~ | ~~~ | ~~~ | ~~~ | ~~~~ | ~~~~ | ~~~ | ~~~ | ~~~ |
| Jul 2014 | ~~~~ | ~~~~ | ~~~ | ~~~ | ~~~ | ~~~~ | ~~~~ | ~~~ | ~~~ | ~~~ |
| Aug 2014 | ~~~~ | ~~~~ | ~~~ | ~~~ | ~~~ | ~~~~ | ~~~~ | ~~~ | ~~~ | ~~~ |
| Sep 2014 | ~~~~ | ~~~~ | ~~~ | ~~~ | ~~~ | ~~~~ | ~~~~ | ~~~ | ~~~ | ~~~ |
| Oct 2014 | ~~~~ | ~~~~ | | | | ~~~~ | ~~~~ | | | |
| Nov 2014 | ~~~~ | ~~~~ | | | | ~~~~ | ~~~~ | | | |
| Dec 2014 | ~~~~ | ~~~~ | | | | ~~~~ | ~~~~ | | | |
| Jan 2015 | ~~~~ | ~~~~ | | | | ~~~~ | ~~~~ | | | |

*FIG. 11*

INTEGRATED PREDICTIVE ANALYSIS

BACKGROUND

Enterprise computing systems receive, generate, and store data related to many aspects of an enterprise. Users operate reporting tools to access such data and display the data in useful formats, such as in graphic visualizations. Specifically, a reporting tool may submit a query to a backend data source and present a visualization of a returned result set.

Predictive analysis tools generate predictive, or forecast, data based on stored backend data. Forecast data may comprise estimations of future sales, profits, etc. Conventional reporting tools are insufficiently integrated with predictive analysis tools. Specifically, many user-initiated steps are required to extract the stored data, convert the extracted data into a format consumable by a predictive analysis tool, and import the converted data into the predictive analysis tool. Similarly-cumbersome steps are then required to incorporate any generated forecast data into the original (i.e., actual) data.

BRIEF DESCRIPTION OF THE DRAWINGS

FIG. 4 is an outward view of a user interface displaying a data visualization according to some embodiments.

FIG. 5 is a tabular representation of a portion of a data source according to some embodiments.

FIG. 6 is an outward view of a user interface displaying a data visualization according to some embodiments.

FIG. 8 is a tabular representation of an aggregation of a portion of a data source according to some embodiments.

FIG. 9 is a tabular representation of forecast data according to some embodiments.

FIG. 11 is a tabular representation of a portion of a data source including disaggregated forecast data according to some embodiments.

DETAILED DESCRIPTION

The following description is provided to enable any person in the art to make and use the described embodiments. Various modifications, however, will remain readily apparent to those in the art.

Generally, some embodiments improve the efficiency of data analysis by inventive integration of predictive analysis tools with reporting tools and backend data storage. Such embodiments may provide more efficient forecasting, flexibility in predictions, and/or improved integration with other analytics and planning workflows.

Figure 1:
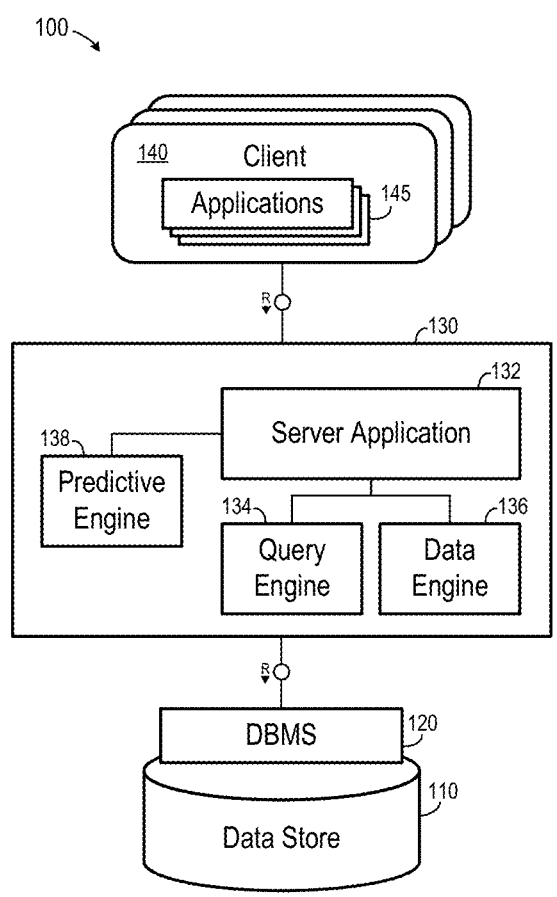
FIG. 1 is a block diagram of a system architecture according to some embodiments.

FIG. 1 is a block diagram of architecture 100 according to some embodiments. Embodiments are not limited to architecture 100 or to a database architecture.

Architecture 100 includes data store 110, database management system (DBMS) 120, server 130, and clients 140. More specifically, server 130 may execute server application 132 to receive requests from applications 145 and to provide user interfaces (e.g., in eXtended Markup Language (XML), HyperText Markup Language (HTML) and/or JavaScript) to clients 140 in response. Server 130 may execute query engine 134 to retrieve data from data store 110 based on the received requests, and server application 132 may provide the processed data to applications 145.

In one specific example, a client 140 executes an application 145 to present a user interface to a user on a display of the client 140. The user enters a query into the user interface, and the application 145 passes a request based on the query to server application 132. Query engine 134 receives the query from server application 132, generates an SQL script based on the request, and forwards the SQL script to DBMS 120. DBMS 120 executes the SQL script to return a result set to server application 132 based on data of data store 110, and the application 145 generates and displays a report/visualization based on the result set.

The query may leverage a semantic layer defining a set of objects. The semantic layer may be defined by metadata stored within data store 110 and/or a separate repository (not shown). Each object associates one or more physical entities (e.g., a physical database table, associated columns of one or more database tables, etc.) of data store 110 with user-friendly names. These objects may be classified as dimensions, along which one may perform an analysis or report (e.g., Year, Country, Product), or measures (e.g., Sales, Profit), whose values can be determined for a given combination of dimension values (e.g., 2006, U.S.A., Televisions). Accordingly, a user-generated query may include thusly-defined dimensions, dimension values and/or measures, and the metadata is used to execute the query with respect to the corresponding physical entities of data store 110. The query may also include other information such as filters.

Server 130 provides any suitable protocol interfaces through which applications 145 executing on clients 140 may communicate with server 130. For example, server 130 may include a HyperText Transfer Protocol (HTTP) interface supporting a transient request/response protocol over Transmission Control Protocol (TCP), and/or a WebSocket interface supporting non-transient full-duplex communications between server 130 and any clients 140 which implement the WebSocket protocol over a single TCP connection. Server 130 may communicate with DBMS 120 using database management interfaces such as, but not limited to, Open Database Connectivity (ODBC) and Java Database Connectivity (JDBC) interfaces.

DBMS 120 serves requests to query, retrieve, create, modify (update), and/or delete data of data store 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Server 130 may be separated from or closely integrated with DBMS 120. A closely-integrated server 130 may enable execution of services completely on the database platform, without the need for an additional server. For example, according to some embodiments, server 130 provides a comprehensive set of embedded services which provide end-to-end support for Web-based applications. The services may include a lightweight web server, configurable support for Open Data Protocol, server-side JavaScript execution and access to SQL and SQLScript.

Data store 110 may comprise any data sources which are or become known, including but not limited to database views, spreadsheets, relational databases and/or OnLine Analytical Processing cubes. Data store 110 may also comprise any query-responsive data source or sources that are or become known, including but not limited to a structured-query language (SQL) relational database management system. Data store 110 may comprise a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each of clients 140 may comprise one or more devices executing program code of an application 145 for presenting user interfaces to allow interaction with server 130. The user interfaces of applications 145 may comprise user interfaces suited for reporting, data analysis, and/or any other functions based on the data of data store 110.

Presentation of a user interface as described herein may comprise any system to render visualizations. For example, a client 140 may execute a Web Browser to request and receive a Web page (e.g., in HTML format) from server 130 via HTTP, HTTPS, and/or WebSocket, and may render and present the Web page according to known protocols. In another example, an application 145 may comprise a user interface component and an engine component. The user interface component transmits JavaScript calls to the engine component in response to user interactions and the engine component transmits corresponding HTTP calls to server 130. The engine component receives XML, HTML and/or JavaScript from server 130 in response, and provides corresponding HTML and custom style sheet (CSS) data to the user interface component for rendering thereby. Such an implementation may allow data exchange and presentation without requiring full page reloads.

Figure 2:
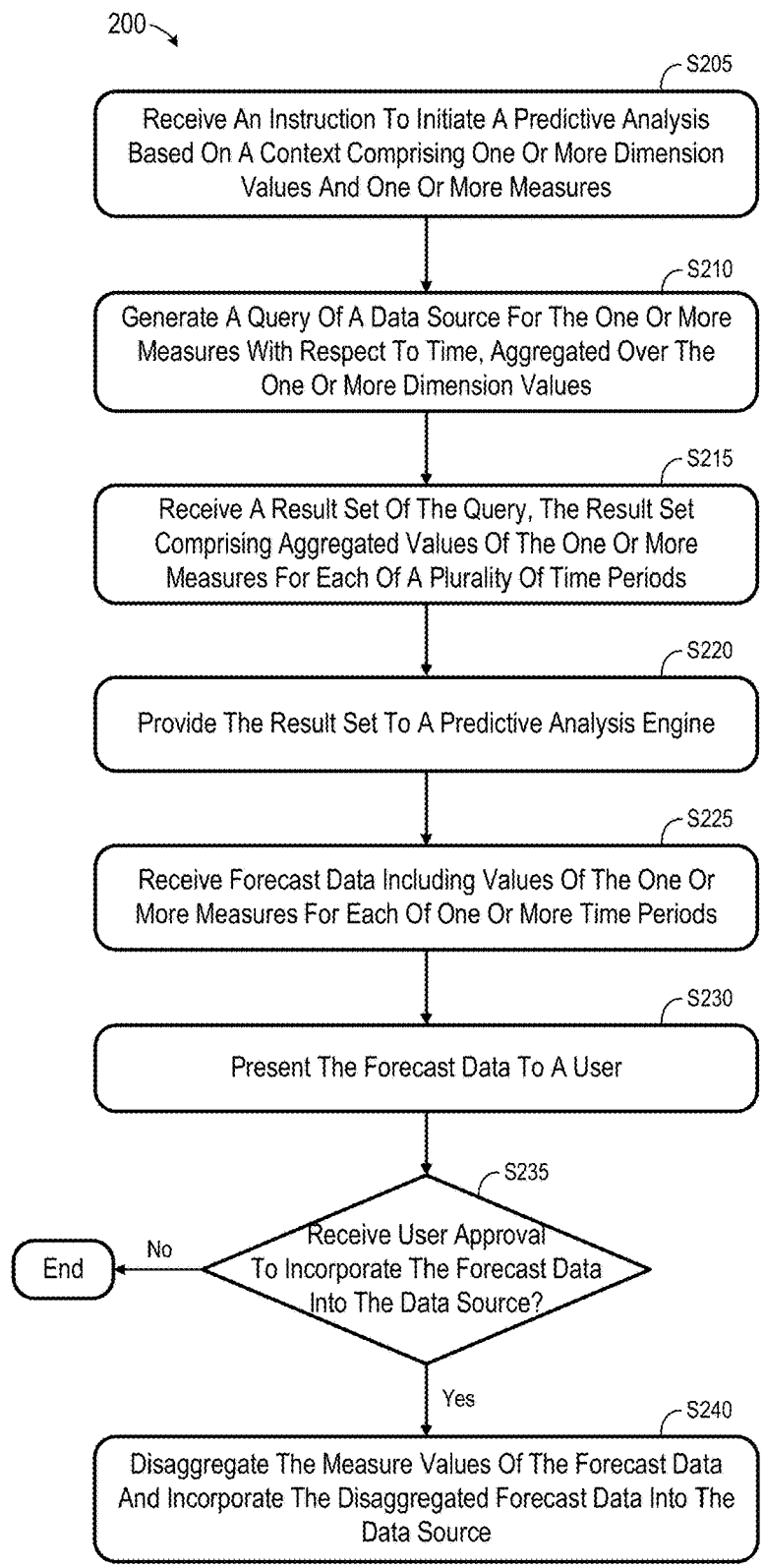
FIG. 2 is a flow diagram of a process according to some embodiments.

FIG. 2 comprises a flow diagram of process 200 according to some embodiments. In some embodiments, various hardware elements of system 100 execute program code to perform process 200. Process 200 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S205, an instruction is received to initiate a predictive analysis based on a context. A context may include one or more dimension values and one or more measures. According to some embodiments, the context may be specified in a query submitted by a user of a client device 140.

Figure 3:
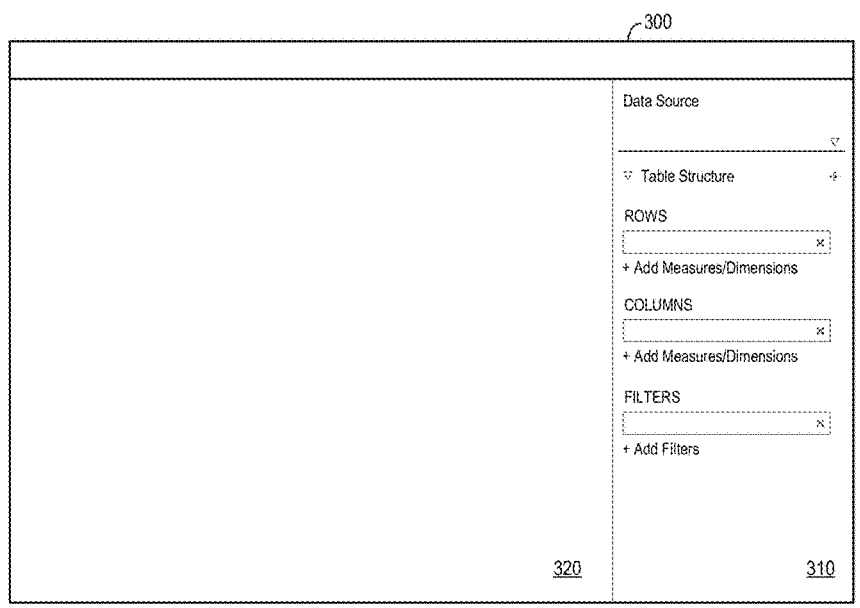
FIG. 3 is an outward view of a user interface to generate a data visualization according to some embodiments.

Some embodiments provide for efficient and intuitive specification of the context and issuance of the instruction at S205. FIG. 3 illustrates user interface 300 according to some embodiments. Embodiments are not limited to interface 300. Interface 300 may comprise a Web page provided by server application 132 in response to a request from a Web browser application 145 executing on client 140. Any client application 145 may be used to display interface 300, which is not limited to Web-based formats.

Interface 300 includes query definition area 310 to receive metadata defining a data visualization from a user. Area 310 includes fields which allow a user to specify a data source and a chart structure (e.g., table, pie, line, bar, etc.). In the present example, a table structure is specified. Accordingly, other fields of area 310 are provided for defining table rows (i.e., the measures and/or dimensions to be represented in table rows), table columns (i.e., the measures and/or dimensions to be represented in table columns), and filters to be applied to the rows and columns.

FIG. 4 illustrates interface 300 after input of metadata into area 310 according to some embodiments. A user has selected a data source (i.e., ProfitAandLoss, which may comprise a table stored in data store 110), and measures and dimensions associated with rows and columns of a table chart. Specifically, the user has associated the dimensions Product and Region and the measure hierarchy Account with rows of the table chart, and the dimension Version with columns of the table chart.

Visualization 400 is generated and displayed based on the metadata of area 310. Per conventional operation, server 130 may receive the metadata as it is entered, generate an SQL script based on the metadata and on metadata of data store 110 which associates the dimensions and measures with the data of data store 110, and forward the script to DBMS 120. DBMS 120 executes the SQL script to return a corresponding result set to an application 145 based on data of data store 110 (i.e., the data associated with data source ProfitAndLoss), and a visualization 400 of the result set is presented to the user. The visualization may be rendered on server 130 or may be transmitted to client 140 as XML, HTML and JavaScript for rendering thereon as described above.

As shown in FIG. 4, the dimensions Product and Region each represent a hierarchy of dimension values. The values of the version column are aggregated depending upon the drill-down state of various rows of visualization 400. For example, cell 405 includes the aggregated Net Revenue over all products and all companies (i.e., regions), while cell 410 includes the aggregated Net Revenue over all companies and over all Apparel, cell 415 includes the aggregated Net Revenue over all companies and over all Footwear, and cell 420 includes the aggregated Net Revenue over all companies and over all Accessories. The value of cell 405 is therefore an aggregation of cells 410, 415 and 420, which are in turn aggregations of the Region dimension and the Apparel, Footwear and Accessories sub-hierarchies, respectively.

Table 500 is a tabular representation of a portion of data source ProfitAndLoss according to some embodiments. As illustrated in FIG. 4, the data source ProfitAndLoss includes measure and dimension values not represented in table 500. Table 500 illustrates the North America sub-hierarchy of the Region dimension and the Apparel and Footwear sub-hierarchies of the Product dimension. For each combination of dimension values, table 500 includes a value of the measure Net Revenue. As shown, table includes measure values only thorough September 2014. It will be assumed that a user wishes to generate forecast data for a particular subset of dimension values of table 500.

Returning to process 200, it will be assumed that the user selects cell 600, using a suitable input device action (e.g., a left-click). Selection of cell 600 results in display of tool menu 610, including forecast tool 615. The user selects forecast tool 615 in order to issue the instruction to initiate a predictive analysis which is received at S205. Moreover, the cells which are selected (i.e., cell 600) at the time of selection of forecast tool 615 indicate the context on which the predictive analysis is to be based.

More specifically, the context is determined based on the row and column headers associated with the selected cell(s). The row and column headers of the present example (i.e., Version=Actual; Account=Net Revenue; Product=Apparel; and Region=North America) consist of dimension values (i.e., Actual, Apparel and North America) and a measure (i.e., Net Revenue). Any filters applied to the selected cells are also determined. The headers and filters are merged to result in the context on which the predictive analysis will be based. Since no filters are applied in the present example, the context is Version=Actual; Account=Net Revenue; Product=Apparel; and Region=North America.

Figure 7:
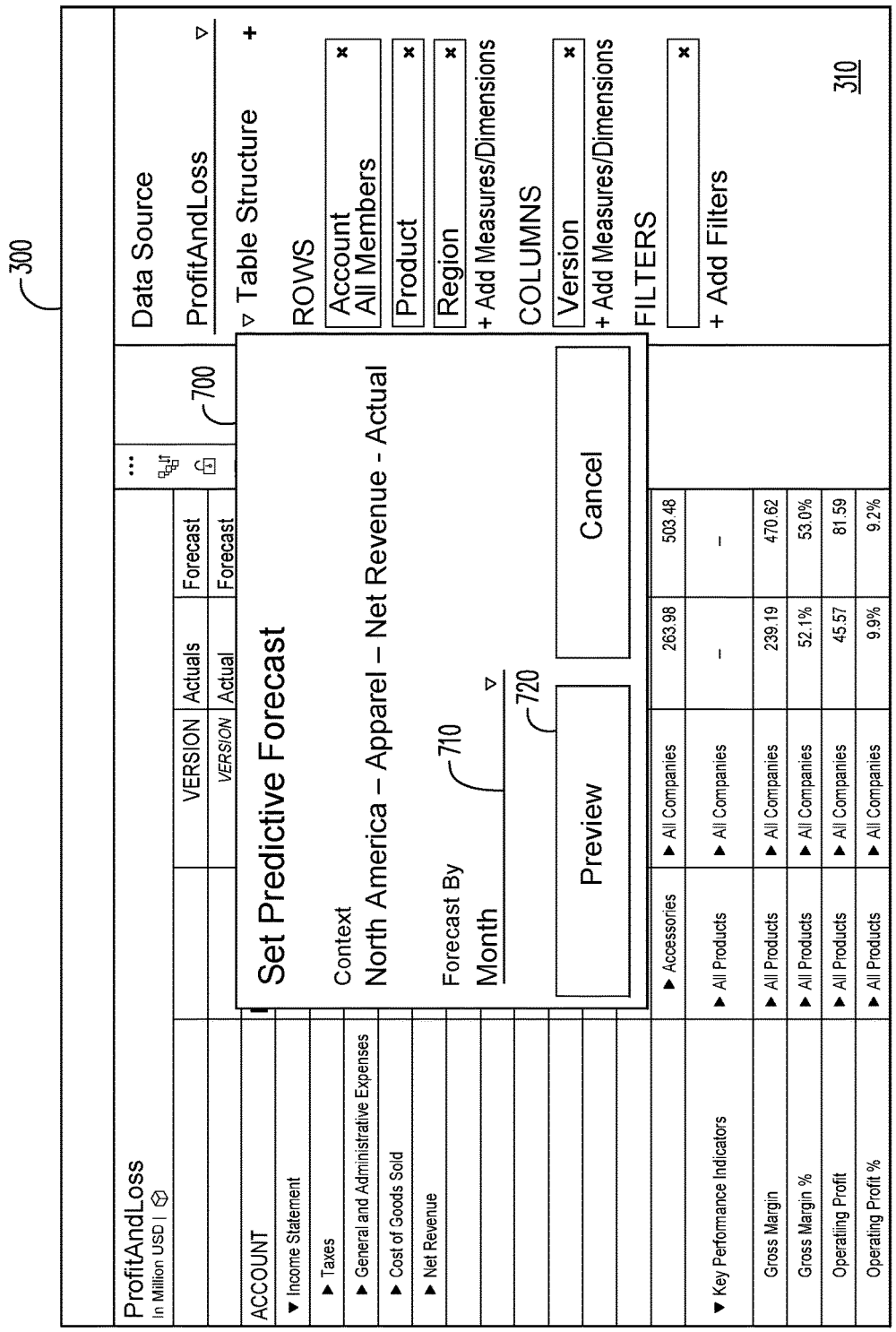
FIG. 7 is an outward view of a user interface displaying a dialog to initiate a predictive analysis according to some embodiments.

FIG. 7 illustrates dialog 700 which may be displayed after selection of forecast tool 615 and determination of the context as described above according to some embodiments. As shown, dialog 700 presents the context and also provides drop-down input field 710 to specify time increments of the generated forecast data. The user has selected "Month" to indicate that forecast data should be generated on a monthly basis.

A query is generated at S210 in response to user selection of preview control 710. The query is generated so as to query data source from which the context was determined (e.g., the data source from which the values of the selected cells was determined). The query queries the data source for the one or more measures of the context, as aggregated over the dimension values of the context according to specified time increments (e.g., monthly).

Analytic queries may include measures, dimensions, and filters. According to some embodiments of S210, an analytical query is determined including a measure which is the measure of the context and including the sole dimension Time. Finally, the dimension values and any filters of the context (excluding measure and time dimension values) are used as filters in the query. According to the present example, and expressed in SQL, the query generated at S210 may be as follows:
SELECT "Net Revenue", "Time" FROM "ProfitAndLoss" WHERE "Product"='Apparel'
AND "Region"='North America' AND "Version"='Actual'
GROUP BY "Time"

S210 may be executed by server application 132 after receiving the instruction and context from client 140, but embodiments are not limited thereto. The query may be passed to query engine 134 and executed as described above.

A result set is received at S215. The result set includes an aggregated value of each measure of the context for each of a plurality of time periods. FIG. 8 illustrates result set 800 according to the present example. Result set 800 includes two columns: Time and Net Revenue.

Result set 800 is provided to a predictive analysis engine at S220. The two-column format of result set 800, with Time as one column, may conform to the preferred input format of the predictive analysis engine. With reference to system 100, server application 132 may provide result set 800 to predictive engine 138 according to some embodiments of S220.

Forecast data is received from the predictive analysis engine at S225. Embodiments are not limited to any particular type of predictive analysis engine or any particular systems or algorithms for determining forecast data. The forecast data includes values of the one or more measures of the context for each of one or more time periods. FIG. 9 shows forecast data 900 received at S225 and determined based on result set 800 according to the present example. Each row of forecast data 900 specifies a particular month and a value for the measure Net Revenue for that month. The value of Net Revenue is an aggregated value based on the values for Net Revenue for all sub-dimensions of Apparel and North America.

Figure 10:
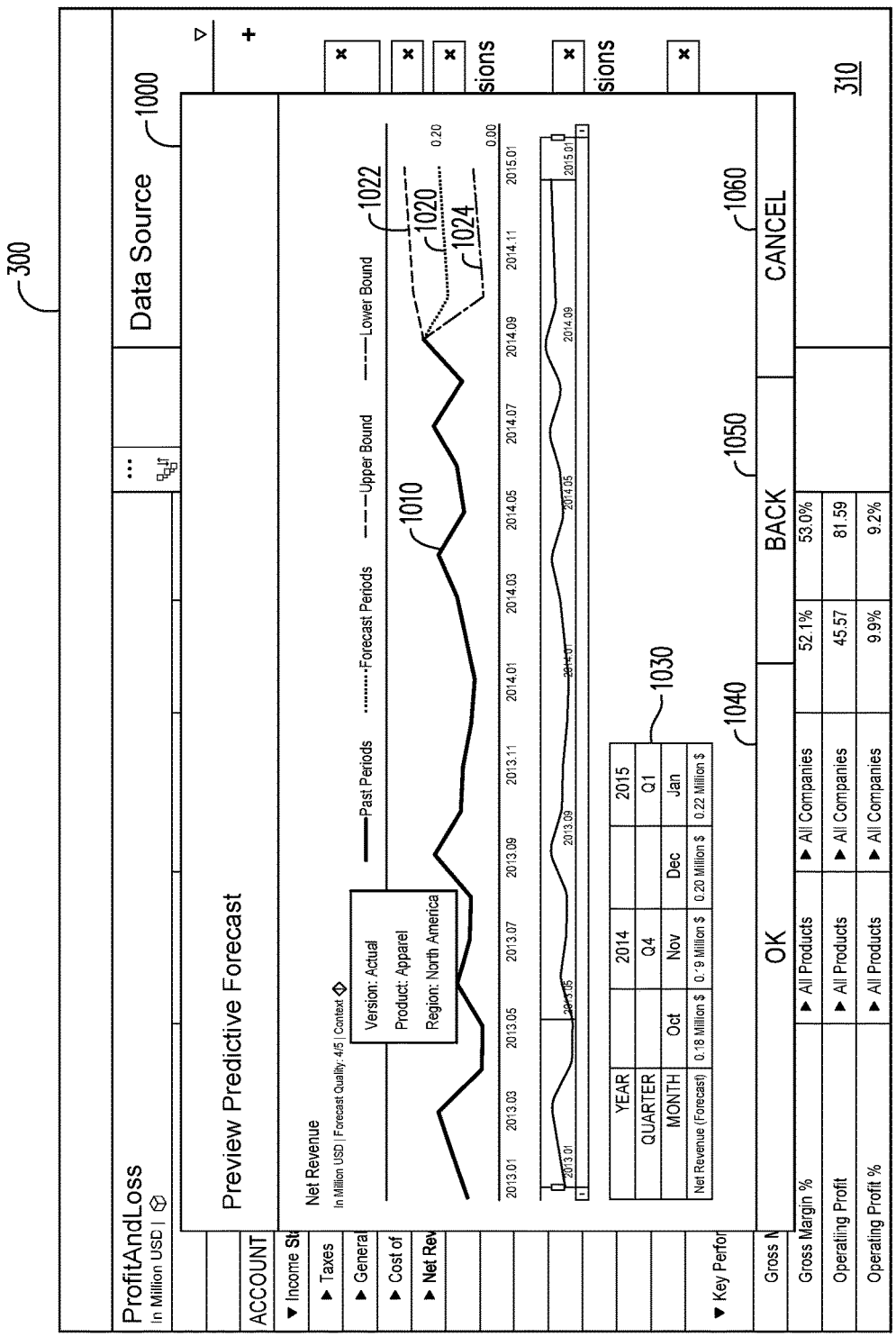
FIG. 10 is an outward view of a user interface displaying a data visualization including forecast.

The forecast data is presented to the user at S230. According to some embodiments, the forecast data is presented to user in a preview graph and table such as that illustrated in dialog 1000 of FIG. 10. Dialog 1000 illustrates a line chart including line segment 1010 which illustrates the received result set (e.g., result set 800) and line segment 1020 which illustrates the generated forecast data (e.g., forecast data 900). Table 1030 includes the generated forecast data as well.

Line segments 1022 and 1024 represent an upper bound and a lower bound, respectively, of the forecast data. These bounds may be determined based on a margin of error provided by the predictive analysis engine along with the forecast data.

At S235, it is determined whether the user has approved incorporation of the forecast data into the original data source. According to the present example, a user selection of Back control 1050 or Cancel control 1060 is considered a denial of user approval, and process 200 therefore terminates. However, if the user selects OK control 1040, user approval is received and flow proceeds to S240 to incorporate the forecast data into the data source.

The measure values of the forecast data are disaggregated prior to incorporation of the forecast data into the data source. In this regard, the measure values of the forecast data do not correspond to individual cells of the data source, since they were determined based on aggregated measure values from multiple cells. With reference to the present example, each Net Revenue value of forecast data 900 is disaggregated into Net Revenue values associated with all combinations of dimension values in the North America and Apparel hierarchies. More specifically, each Net Revenue value of forecast data 900 is disaggregated into Net Revenue values for each of (U.S.A., Shirts), (U.S.A., Shorts), (Canada, Shirts), and (Canada, Shorts).

Disaggregation of the measure values may proceed according to any suitable calculation. For example, the measure values may be disaggregated according to the relative proportions of the corresponding most-recent measure values (e.g., the September 2014 measure values corresponding to (U.S.A., Shirts), (U.S.A., Shorts), (Canada, Shirts), and (Canada, Shorts)). In other embodiments, the user may select the values (e.g., by selecting a corresponding date) on whose proportions the disaggregation will be based. In still other embodiments, the disaggregation may be based on an average relative proportion of the corresponding measure values over a given period of time (e.g., all time). The disaggregation may be based on a predetermined or fixed proportion according to some embodiments.

FIG. 11 illustrates table 500 after incorporation of the disaggregated measure values at S240. According to some embodiments, server application 132 issues a request to data engine 136 to incorporate the disaggregated measure values into the data source stored in data store 110. In some embodiments, the data is incorporated into a "personal" version of the data source which is associated with the user, thereby preserving the integrity of the master data. The user may access this personal data, but it may not be visible to other users.

According to some embodiments, process 200 may be repeated based on the personal version of the data source to repredict the forecast values. For example, the user may initiate a predictive analysis at S205 with respect to specific time periods which do not include some or all of the incorporated disaggregated measure values of the forecast data. Such a feature may facilitate an initial coarse prediction followed by more a refined prediction based on a more detailed context.

Figure 12:
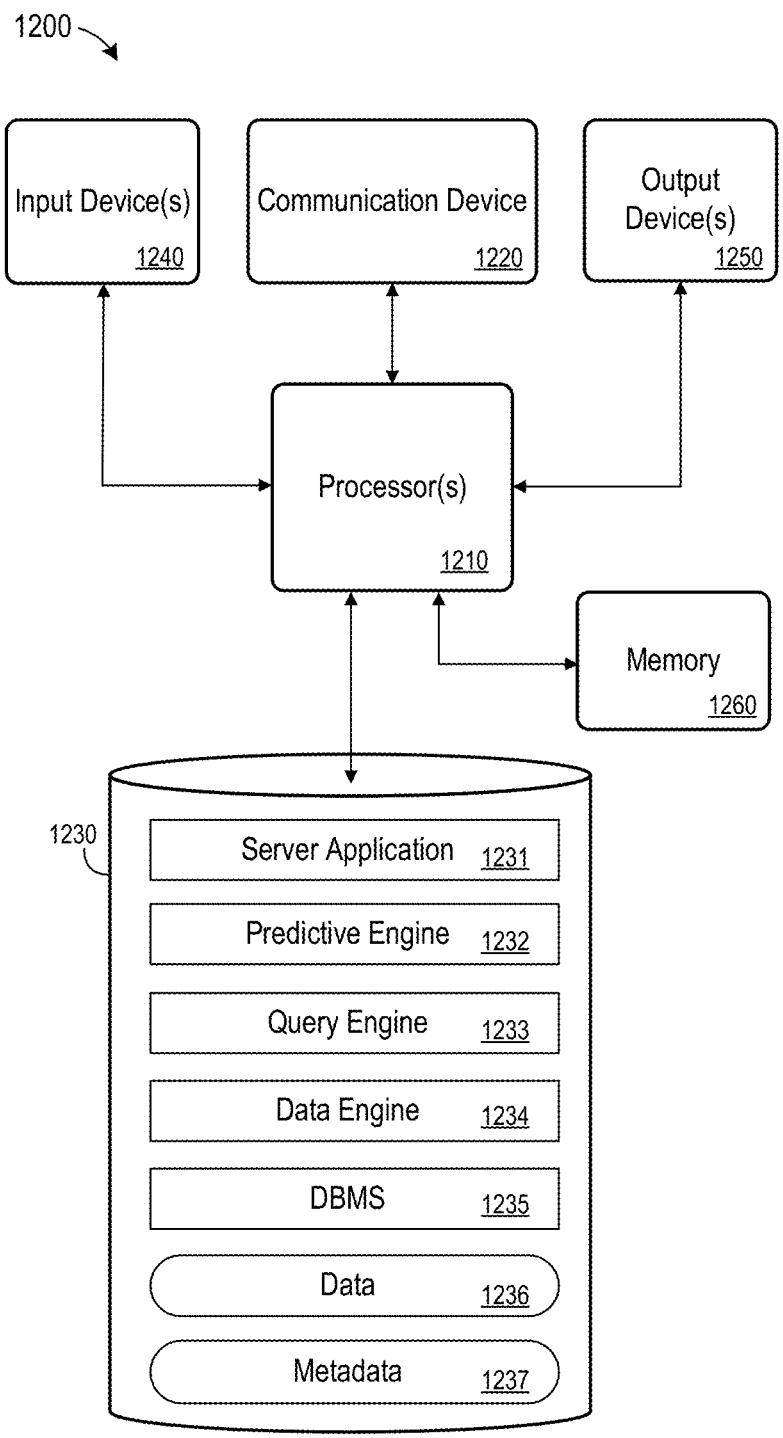
FIG. 12 is a block diagram of an apparatus according to some embodiments.

FIG. 12 is a block diagram of apparatus 1200 according to some embodiments.

Apparatus 1200 may comprise a general-purpose computing apparatus and may execute program code to perform any of the functions described herein. Apparatus 1200 may comprise an implementation of server 130, DBMS 120 and data store 110 of FIG. 1 in some embodiments. Apparatus 1200 may include other unshown elements according to some embodiments.

Apparatus 1200 includes processor(s) 1210 operatively coupled to communication device 1220, data storage device 1230, one or more input devices 1240, one or more output devices 1250 and memory 1260. Communication device 1220 may facilitate communication with external devices, such as a reporting client, or a data storage device. Input device(s) 1240 may comprise, for example, a keyboard, a keypad, a mouse or other pointing device, a microphone, knob or a switch, an infra-red (IR) port, a docking station, and/or a touch screen. Input device(s) 1240 may be used, for example, to enter information into apparatus 1200. Output device(s) 1250 may comprise, for example, a display (e.g., a display screen) a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, etc., while memory 1260 may comprise Random Access Memory (RAM), Storage Class Memory (SCM) or any other fast-access memory.

Server application 1231, predictive engine 1232, query engine 1233, data engine 1234 and DBMS 1235 may comprise program code executed by processor 1210 to cause apparatus 1200 to perform any one or more of the processes described herein. Embodiments are not limited to execution of these processes by a single apparatus.

Data 1236 and metadata 1237 (either cached or a full database) may be stored in volatile memory such as memory 1260. Metadata 1237 may include information regarding dimensions, dimension values, and measures associated with the data sources stored within data 1236. Data storage device 1230 may also store data and other program code for providing additional functionality and/or which are necessary for operation of apparatus 1200, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a user device to:
      receive, from a user, a selection of a value of a measure; and
   a server device to:
      receive the selection of the value of the measure from the user device;
      determine a query context based on the selection, the query context comprising the measure and one or more dimension values of a data source associated with the measure value;
      generate a query of the data source for the measure over time and aggregated over the one or more dimension values;
      receive a result set of the query;
      provide the result set to a predictive analysis engine;
      receive forecast data based on the result set, the forecast data comprising forecast values of the measure over time, aggregated over the one or more dimension values;
      receive an instruction from the user device to incorporate the forecast data into the data source; and
      determine two or more disaggregated forecast measure values for each forecast measure value, each of the two or more disaggregated forecast measure values being associated with a combination of child dimension values of the one or more dimension values.

2. The system according to claim 1, wherein selection of the value of the measure comprises selection of a table cell including the value, wherein the measure and the one or more dimension values are associated with a row or a column of the table cell.

3. The system according to claim 1, wherein the query context comprises a filter on one of the one or more of the dimension values, and wherein the query comprises the filter.

4. The system according to claim 1, wherein generation of the query comprises generation of a query including a filter for each of the one or more dimension values.

5. The system according to claim 4, and wherein the query context comprises a query filter, and wherein generation of the query comprises generation of a query including the query filter.

6. A system comprising:
a memory storing processor-executable process steps; and
a processor to execute the processor-executable process steps to cause the system to:
determine a query context comprising a measure and one or more dimension values of a data source;
generate a query of the data source for the measure over time and aggregated over the one or more dimension values;
receive a result set of the query;
provide the result set to a predictive analysis engine;
receive forecast data based on the result set, the forecast data comprising forecast values of the measure over time, aggregated over the one or more dimension values;
receive an instruction to incorporate the forecast data into the data source; and
determine two or more disaggregated forecast measure values for each forecast measure value, each of the two or more disaggregated forecast measure values being associated with a combination of child dimension values of the one or more dimension values.

7. The system according to claim 6, wherein the query context comprises a filter on one of the one or more of the dimension values, and wherein the query comprises the filter.

8. The system according to claim 6, wherein generation of the query comprises generation of a query including a filter for each of the one or more dimension values.

9. The system according to claim 8, and wherein the query context comprises a query filter, and wherein generation of the query comprises generation of a query including the query filter.

10. The system according to claim 6, wherein determination of the query context comprises reception of a selection of a table cell including a value, and determination of the measure and the one or more dimension values based on the table cell.

11. The system according to claim 10, wherein determination of the measure and the one or more dimension values based on the table cell comprises determination of the row and column associated with the table cell and determination that the measure and the one or more dimension values are associated with the row or the column.

12. A computer-implemented method comprising:
determining a query context comprising a measure and one or more dimension values of a data source;
generating a query of the data source for the measure over time and aggregated over the one or more dimension values;
receiving a result set of the query;
providing the result set to a predictive analysis engine;
receiving forecast data based on the result set, the forecast data comprising forecast values of the measure over time, aggregated over the one or more dimension values;
receiving an instruction to incorporate the forecast data into the data source; and
determining two or more disaggregated forecast measure values for each forecast measure value, each of the two or more disaggregated forecast measure values being associated with a combination of child dimension values of the one or more dimension values.

13. The method according to claim 12, wherein the query context comprises a filter on one of the one or more of the dimension values, and wherein the query comprises the filter.

14. The method according to claim 12, wherein generating the query comprises generating a query including a filter for each of the one or more dimension values.

15. The method according to claim 14, and wherein the query context comprises a query filter, and wherein generating the query comprises generating a query including the query filter.

16. The method according to claim 12, wherein determining the query context comprises receiving a selection of a table cell including a value, and determining the measure and the one or more dimension values based on the table cell.

17. The method according to claim 16, wherein determining the measure and the one or more dimension values based on the table cell comprises determining the row and column associated with the table cell and determining that the measure and the one or more dimension values are associated with the row or the column.

* * * * *